Oct. 11, 1927.
M. A. GUYER
1,645,235
CAKE PAN
Filed May 11, 1926
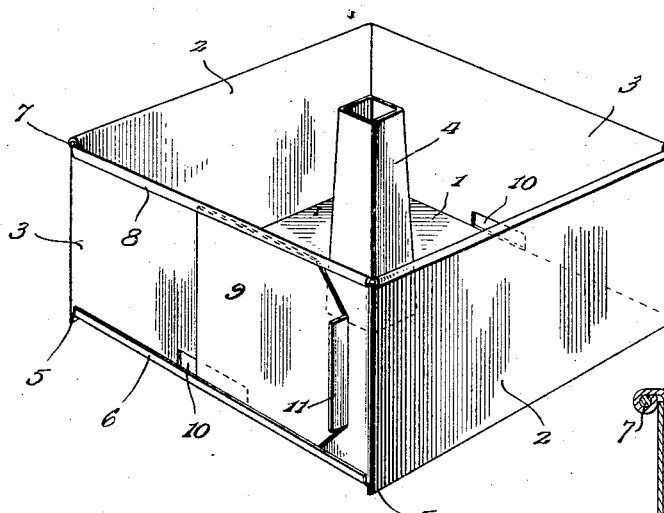
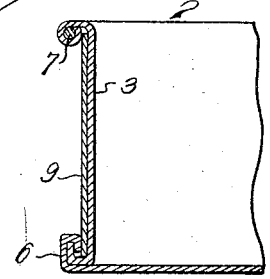
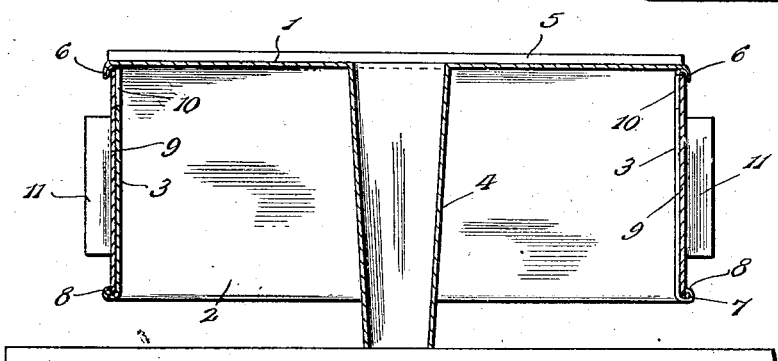
Inventor
M. A. Guyer.
By Lacey & Lacey, Attorneys Patented Oct. 11, 1927.

1,645,235

UNITED STATES PATENT OFFICE.

MARY ALICE GUYER, OF HUTSONVILLE, ILLINOIS.

CAKE PAN.

Application filed May 11, 1926. Serial No. 108,335.

This invention relates to cooking utensils and more particularly to a cake pan.

One object of the invention is to provide a cake pan in which a cake may be evenly baked and the pan then supported in an inverted position so that the cake will be prevented from sinking in the pan while cooling.

Another object of the invention is to provide the walls of the pan with openings through which a knife may be inserted to loosen the cake from the bottom of the pan, the openings being normally closed by shutters mounted for sliding into and out of closing relation to the openings.

Another object of the invention is to provide the pan with lower flanges, certain of which may serve to slidably mount the shutters and the remaining flanges constitute supports to retain the pan in spaced relation to the bottom of an oven.

This invention is illustrated in the accompanying drawing, wherein

Figure 1 is a perspective view of the improved cake pan;

Fig. 2 is a view showing the pan in cross section and resting upon a table in an inverted position.

Figure 3 is a vertical sectional view on an enlarged scale, through one of the walls of the pan.

The pan forming the subject-matter of this invention is preferably formed of sheet metal and is provided with a bottom 1 and opposed side walls 2 and 3. The pan is preferably square when viewed in top plan and the walls extend upwardly from the bottom at right angles thereto so that a cake baked in the pan will be of approximately the same dimensions throughout its depth. A column 4, which is also formed of sheet metal and in cross section or top plan conforms to the shape of the pan, extends upwardly from the bottom about an opening formed centrally therein and is of such height that its upper end portion projects above the plane of the upper edges of the side walls 2 and 3. Therefore, when the pan is removed from an oven after a cake has been baked, it may be supported in an inverted position upon the column, as shown in Fig. 2, and the cake will be prevented from shrinking and sinking into the pan while it is cooling. This is very important when baking a cake, such as an angel cake, as a cake of this type has a tendency to shrink if allowed to cool with the pan resting in the normal position.

The side walls 2 and 3 have their lower edge portions crimped into engagement with the marginal portions of the bottom, as shown in Fig. 2, and the joined portions of the bottom and walls form flanges 5 and 6 all of which originally project downwardly from the bottom. After the walls have been joined to the bottom, the flanges of the walls 3 are clipped adjacent the ends of these walls and the flanges are bent upwardly to provide tracks along the lower edges of the walls. It should be further noted that since the flanges 6 are turned upwardly air may pass beneath the bottom of the pan between the depending supporting flanges 5 and move upwardly through the hollow column or pillar 4. The column or pillar will, therefore, be thoroughly heated by the air moving through it and the cake will be evenly baked. At their upper edges the walls 2 and 3 are turned outwardly over a reinforcing wire 7 to provide the walls with smooth upper edges and further provide the walls 3 with depending flanges 8 along their upper edges which cooperate with the tracks or flanges 6 and serve to slidably mount closure plates 9 which are adapted to be moved into and out of closing relation to slots 10 formed in the walls 3 adjacent the bottom 1. One end portion of each closure plate is tapered and bent to provide a lip 11 by means of which the plate may be readily grasped and movement imparted to the plate.

When the pan is in use, the cake dough is poured into the pan in the usual manner and as the plates 9 are normally disposed in closing relation to the slots 10 leakage of the dough through these slots will be prevented. The pan is placed in the oven and since it rests upon the depending flanges 5 its bottom will be supported in spaced relation to the bottom of the oven and air may pass beneath the pan and upwardly through the hollow column 4. The cake will, therefore, be evenly baked and one portion will not be cooked too much. When the cake is baked, it is removed from the oven and the pan supported in an inverted position upon the column 4, as shown in Fig. 2, and allowed to remain in this position until the cake has cooled. After the cake has cooled, the pan is returned to an upright position and a knife passed between the cake and the walls 2 and 3. The closure plates are then moved to an open position and the knife passed inwardly through the slots 10 in order to loosen the cake from the bottom of the pan. A knife may also be passed downwardly between the cake and the walls of the column. The cake may, therefore, be loosened from all parts of the pan and will drop out when the pan is again inverted.

Having thus described the invention, I claim:

A baking pan comprising a body having a bottom formed with opposed side edges, walls extending upwardly from the edges of said bottom and having their upper edge portions folded outwardly and at their lower ends joined to the bottom by seams, certain of said walls being formed with openings adjacent their junction with the bottom and having their seams projected upwardly to cooperate with their outwardly folded upper portions to form tracks, the other walls having their seams extending downwardly and constituting flanges to support the pan with its bottom in an elevated position, and closure plates slidably mounted by said tracks for movement into and out of closing relation to said slots.

In testimony whereof I affix my signature.

MARY ALICE GUYER. [L. S.]